United States Patent [19]
Welsh

[11] 3,757,559
[45] Sept. 11, 1973

[54] METHOD FOR MAKING STRUCTURAL PANEL BENT FROM LAMINATED HONEYCOMB

[75] Inventor: James W. Welsh, Logan, Utah
[73] Assignee: Hughes Aircraft Company, Culver City, Calif.
[22] Filed: Feb. 9, 1972
[21] Appl. No.: 224,835

[52] U.S. Cl............... 72/379, 72/389, 29/455 LM, 156/198
[51] Int. Cl.............................................. B21d 5/00
[58] Field of Search................... 72/362, 363, 379, 72/389; 29/455 LM; 113/116 A, 116 F; 156/198, 211, 220, 221, 225

[56] References Cited
UNITED STATES PATENTS

| 2,333,343 | 11/1943 | Sendzimir........................... 113/116 |
| 2,609,068 | 9/1952 | Pajak.................................... 113/116 |
| 3,196,533 | 7/1965 | Ida et al................................ 29/455 |
| 3,373,480 | 3/1968 | Fuchs, Jr. ............................ 29/455 |
| 3,649,398 | 3/1972 | Keith .................................... 161/119 |
| 3,687,767 | 8/1972 | Reisman et al. ..................... 156/211 |
| 3,042,099 | 7/1962 | Neely.................................... 72/369 |
| 3,670,393 | 6/1972 | Almond................................ 29/455 |

FOREIGN PATENTS OR APPLICATIONS

| 1,260,187 | 3/1961 | France................................. 72/379 |

Primary Examiner—Lowell A. Larson
Attorney—W. H. MacAllister, Jr. et al.

[57] ABSTRACT

A method is disclosed whereby a sandwich composite panel of other than flat configuration is bent from a flat panel by employing a brake-forming operation. The corners of the bent structural panel are shaped so that the inner and outer skins have substantially the same surface length in the bent panel as in the flat sheet. Thus, the sandwich laminate on either side of the bend is undeformed. The method comprises bending the inner lamination skin to a smaller radius and a longer arc than the outer skin. In the resultant bent structural panel, the surface length of each of the inner and outer skins is substantially the same and is substantially the same as before the bend.

1 Claim, 5 Drawing Figures

Patented Sept. 11, 1973 3,757,559

3,757,559

METHOD FOR MAKING STRUCTURAL PANEL BENT FROM LAMINATED HONEYCOMB

BACKGROUND

This invention is directed to the method of bending a structural panel which is formed of inner and outer skins laminated onto a honeycomb or other crushable core.

Honeycomb is well-known material designed for lightweight structures of considerable rigidity. The honeycomb panel structures of the past have generally comprised flat skins separated by lightweight spacers of honeycomb cross-section secured therebetween. The honeycomb core is secured to both of the skins to thus retain the skins in planar condition to maintain structural integrity. The result is a laminated structure of outer skins, stabilized by the interior bonded honeycomb core such that the skins carry tensile and compressive planar loads and are maintained parallel to each other against buckling by the core. The lightweight core resists shear forces due to lateral loads. The laminated composite structure is thus strong in bending, as compared to its weight. The designation "honeycomb" refers to an hexagonal structure of metal, polymer composition material, or paper which is conventionally configured as joined hexagons to provide a high shear modulus in the direction parallel to the generator axis of the hexagons. Other core materials are also available to accomplish similar results. Several types of rigid foam synthetic polymer composition materials can be employed between skins to form a sandwich laminate useful in similar manner.

Flat sandwich laminated structures are easy to build and are of convenient economic construction. When non-flat structures are desired, it has been conventional to shape the core and, in the case of honeycomb, in a direction generally perpendicular to the honeycomb axis and thereafter, laminate skins thereto. Of course, this is expensive and must be accomplished on the basis of individual part design. While strength-to-weight ratio is maintained, cost is considerably higher because of the individual shapes of the particular finished parts. In other structures, shapes are accomplished by cutting flat sandwich laminated panels into parts and securing the parts together by special edge joinery. The edge joinery includes special formed or extruded edge structures which engage within the sandwich, or engage interiorly of the skin sheets and embrace a portion of the sandwich, or engage around the exterior of the skin or combination thereof for joining with the sandwich laminated panel. The problem with sandwich laminated panels is that they have high strength characteristics in bending, and it is difficult to install an edge-joining component thereto and produce a joint which approaches the bending strength of the main body of the laminated panel. Local stress concentrations occur as a result of the edge closeout bar which may reduce strength adjacent to the edges. However, since it has not been previously taught that finished flat sandwich lamination constructions could be bent, fabrication by joining a plurality of panels has been the only way of accomplishing the production of three-dimensional constructions therefrom. Thus, a great deal of prior art has developed in edge joinery bars for joining flat sandwich panels. These edge joinery bars are each directed to one or more of the problems in making an appropriate joint of that nature. However, this invention teaches that an ordinary bent corner joint can be accomplished in flat sandwich lamination material by the bending thereof so that ordinary corner joints of the prior art are obviated.

SUMMARY

In order to aid in the understanding of this invention, it can be stated in essentially summary form that it is directed to a method of producing a bent structural panel. The method comprises simultaneously bending the inner skin with respect to the outer skin, while crushing the core between and while bending the outer skin so that the panel is bent without substantial stretching or compression of the skins.

It is, accordingly, an object of this invention to provide a structural joining technique whereby instructions utilizing sandwich laminated panel can be configured with at least one corner thereof being bent, rather than formed with a corner joint. It is another object to provide a structural joint which allows the panel skins to be continuous around the corner. It is a further object to provide a structural joint having such continuity of skin around the corner to provide radio frequency interference and electromagnetic interference shielding. It is a further object to provide such continuity around the corner to provide undiminished shear strength in a direction parallel to the corner. It is a further object to produce a structural joint which allows at least two adjacent sides thereof, consisting of the same flat laminated sandwich panel, to form the adjacent sides of a construction to provide continuity of shear strength of the skins of the laminated structure and to produce continuity for radio frequency interference and electromagnetic interference attenuation. It is a further object to provide a corner which has limited moment-carrying capability without reducing the high shear and column load capacities inherent in the flat lamination prior to bending.

Other objects and advantages of this invention will become apparent from a study of the following portion of the specification, the claims, and the attached drawings.

DESCRIPTION OF THE PREFERRED EMBODIMENT

Figure 1:
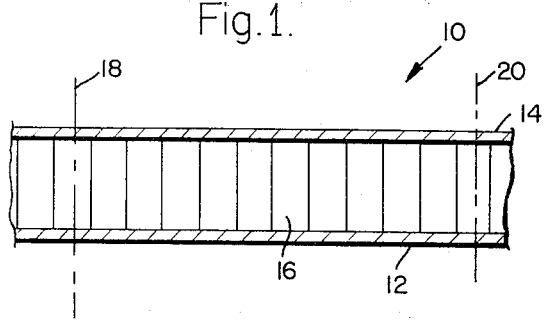
FIG. 1 is a partial section through a sandwich structural panel having a honeycomb core, before bending thereof.

Sandwich laminate panel 10 has an exterior skin 12, an interior skin 14, and a conventional core structure 16 therebetween and bonded thereto.

The sandwich laminate structural panel 10 can be of any or many of the conventional laminated constructions. In most of these constructions, the interior is a honeycomb of aluminum foil or Kraft paper. This type of core is formed in the conventional hexagonal honeycomb arrangement to provide high compressive strength through the honeycomb core 16 of the panel.

Other core materials are also useful. Structural rigid foamed synthetic polymer materials are available which have properties which provide useful sandwich panels. Such materials include foamed polyurethacrylimid, polyvinylchloride, and polyurethane. When properly applied, these foams will provide strength and will crush in the bend.

The exterior and interior skins 12 and 14 are preferably both metallic, when the panel 10 is used in the manner taught by this invention. In any event, both skins must be sufficiently ductile to be able to be bent. Either aluminum and stainless steel skin panels are acceptable and, in some cases, other metals or nonmetals can be used, as long as ductility is adequate. The manner of attachment of the skins to the core is dependent on the nature of the materials of these parts. In some cases, aluminum brazing is employed. In others, adhesive bonding is satisfactory and adequate. For the purposes of this invention, it is assumed that attachment of the skin to the core is adequate to prevent separation or delamination during bending.

Bending is accomplished by crushing the core in a suitable machine, such as between the punch and die in a pressbrake at the same time so that both the inner and outer skins are appropriately bent. During the bending step, neither the inner nor the outer skin is stretched or compressed to degradation. The skins have substantially the same surface length from one point to another on opposite sides of the bend, before and after the bend. Since the inner and outer skins are the same length between reference points before the bend, they are also substantially the same length between those points after the bend. This means that the inner skin is bent into a configuration which has a surface length adequate to utilize the excess material in the bend.

In FIG. 1, reference lines 18 and 20 are parallel to each other and are normal to the surfaces of the skins 12 and 14 of the unbent panel. Under these circumstances, the distances between the lines along the surfaces of the skins are equal. Since bending without substantial stretching or compression of the skins is the manner of deformation, the surface distances between the reference lines 18 and 20 after bending are again substantially equal and are substantially equal to the same diemension before bending.

Figure 2:
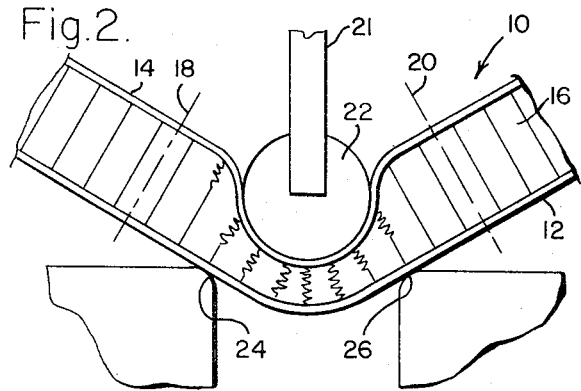
FIG. 2 is a sectional view showing the panel of FIG. 1 being bent by a first species of punch.
Figure 4:
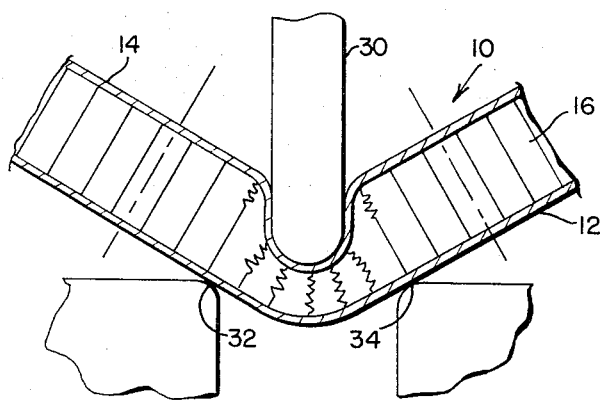
FIG. 4 is similar to FIG. 2, but showing the panel of FIG. 1 being bent by a second species of punch.

Bending is preferably accomplished in an ordinary pressbrake. FIGS. 2 and 4 show sections of pressbrake punch and die sets transverse to their longitudinal axes. FIG. 2 illustrates the preferred embodiment of the punch and die shape, while FIG. 4 illustrates another embodiment. Referring to FIG. 2, punch blade 20 carries punch nose 22 thereon. Punch blade 20 is mounted in the moving portion of the pressbrake and moves toward and away from the die. The die has shoulders 24 and 26. The die, carrying shoulders 24 and 26, is mounted on the fixed portion of the pressbrake so that the shoulders are fixed in position and mounted a known distance apart. Punch nose 22 is in the form of a cylinder having a slot therein, with the slot accepting punch blade 20.

Figure 3:
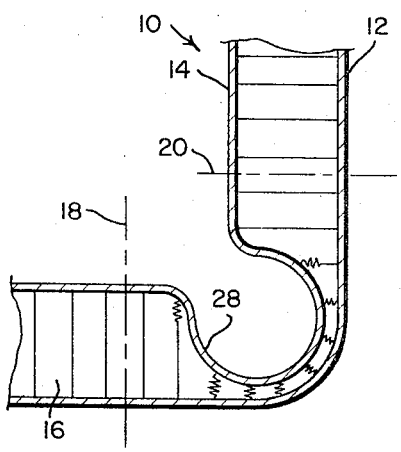
FIG. 3 shows the panel of FIG. 2 bent in a complete right-angle bend with the punch removed.

With the pressbrake opened, and the punch blade 20 raised so that punch nose 22 is away from the die shoulders, sandwich panel 10, of the nature shown in FIG. 1, is inserted into the pressbrake. The line along which the bend is to be made is located directly under the path of motion of the punch blade. Thereupon, the punch blade, carrying punch nose 22, is lowered. The interior skin 14 is bent downward to crush the core therebeneath. Die shoulders 24 and 26 are spaced so that bending of the outer skin 12 also occurs as the punch nose descends. Partial completion of the bend is shown in FIG. 2. If a finished bend in sandwich panel 10 having a total included angle of about 120 degrees is desired, FIG. 2 illustrates the completed bend. However, if a right angle bend in the panel is desired, the punch is moved still further downward, until the exterior skin 12 has the desired right angle bend. The finished part is illustrated in FIG. 3.

It should be noted that, with a punch nose 22, to make a substantially cylindrical shaped wall 28 of the interior skin 14 in the region of the bend, the punch nose is locked into the interior of the bend. It is for this reason that punch nose 22 is made separate from and mounted upon punch blade 20. After the bend is made, the punch blade 20 is withdrawn in an upward direction, and the part is removed from the pressbrake. Thereupon, the punch nose 22 is removed axially of its own length and of the bend.

The character of the bending is such, as noted above, that there is not sufficient malleable stretching or compression of the skin material to degrade the physical characteristics thereof. Thus, the surface distance along the curve of the inner skin between the reference lines 18 and 20 is substantially the same in FIGS. 1, 2, and 3 and, again, is substantially equal to the surface distance along the outer skin between those reference lines. This permits the sandwich panel away from the bend to retain its original strength.

Figure 5:
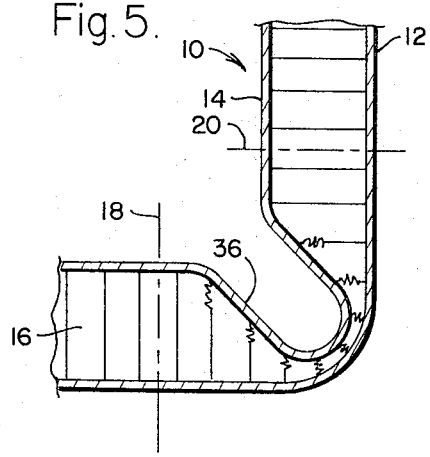
FIG. 5 shows the panel of FIG. 4 having a completed right-angle bend therein, and the punch removed.

FIGS. 4 and 5 illustrate the employment of punch 30 working with a die having shoulders 32 and 34. Punch 30 has planar sides and a round nose. In view of the fact that the shape of the punch 30 is such that it will not be locked in the material, no removable nose is necessary. When a sandwich panel, such as sandwich panel 10, is placed upon the die, and the punch is brought down, the inner skin 14 is bent in a concave direction, while the outer skin 12 is bent in a convex direction. The shape of the inner skin 14 is somewhat different, and straight sides are produced. When the bend has a 120 degree included angle, as in FIG. 4, the inner skin is indented partway to the outer skin. When the panel is bent into a completed right angle, as in FIG. 5, the straight sidewalls 36 in the region bend extend nearly to the outer skin 12. Of course, the depth of penetration of the punch past the plane of the inner wall 14 is a function of the punch width so that proper design must be realized for each type of bend, including the bend angle and the thickness of the sandwich panel. Once the core has been partially collapsed and the inner surface creased, the panel resistance to bending is greatly reduced so that the punch can be withdrawn and the bend completed by simply folding the two legs toward each other. The depth of the crush relates to the angle of final folding or bending.

As a specific example, for bending a right angle bend of the character shown in FIG. 3 in 1-inch thick adhesively-secured aluminum honeycomb sandwich panel, the diameter of the punch nose 22 is one-half inch and the distance between die shoulders 24 and 26 in a direction at right angles to punch motion is 4 inches.

In other die configurations or crushing configurations of the inner skin, more than one die stroke, or a bifurcated two-nosed die can be used to produce two adjacent creases in the corner to produce higher column load capability. Varying the die form and/or the number of creases in the bend has an effect on the resonant frequency of the formed structural corner, thereby providing capability of "tuning" for optimum attenuation of shock forces.

Such a corner bend provides continuity of the inner and outer skins. The continuity of the skins produces a shielding value at the corner for radio frequency and electromagnetic shielding equal to the balance of the panel. There is no mechanical joint through which leakage can occur. Furthermore, shear strength in a shear direction parallel to the bend is unsubstantially unimpaired, because the skin is uninterrupted and most of the shear strength is in the skin. Thus, the shear strength in this direction is better than most fabricated corner joints.

When a sandwich laminated panel is to be formed into a three-dimensional structure, the panel is cut to size and shape in its flat condition, and any desired machining is done on the panel in that condition. For example, fastening points can be inserted, holes drilled, and windows opened through the panel. These operations can be accomplished with tape-controlled milling and drilling machines very economically and precisely while the panel is still flat. Subsequent to the machining, the laminated honeycomb panel is bent in the manner described above. Bends of more or less than 90 degrees can be accomplished. After bending, the panel is installed and its associated parts are attached thereto.

The utility of such a bent sandwich panel is quite broad. Such a bent panel can be employed for the building of electronic cabinets by forming the sides and back thereof, for forming shelters and housings of various sorts, and the like. Furthermore, such bent panels can be employed as structural parts of an airframe, and can be employed for either load bearing of non-load bearing parts thereof. The utility for the structural panel of this invention is quite broad because it has a high strength-to-weight ratio away from the bend, it has high shear strength through the bend in the direction of the bend, and forms a totally closed corner. Thus, the structure is suitable for shock and vibration environments. For this reason, this structure is suitable for a large number of purposes.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

I claim:

1. The method of forming a bent structural panel from laminated sandwich panel having a substantially planar outer skin on the outside thereof, an inner skin on the inside thereof, and a core secured to both said outer and inner skins comprising simultaneously:

bending said inner skin toward said outer skin so that it is concave from the inside in the area to be bent to a curve of greater arc and smaller radius, as compared to the bend in the outer skin without substantial stretching or compressing of said inner skin, crushing the core between the skins, and bending the outer skin in the region of the bend of the inner skin so that it is concave from the inside without substantial stretching or compressing of said inner skin.

* * * * *